(12) United States Patent
Li et al.

(10) Patent No.: US 9,293,933 B2
(45) Date of Patent: Mar. 22, 2016

(54) CHARGING INDICATION APPARATUS AND METHOD THEREOF

(71) Applicant: Acer Incorporated, New Taipei (TW)

(72) Inventors: Po-Yu Li, New Taipei (TW); Kuan-Chi Juan, New Taipei (TW); Meng-Chieh Tsai, New Taipei (TW); Chih-Chieh Yin, New Taipei (TW)

(73) Assignee: Acer Incorporated, Taipei (TW)

( * ) Notice: Subject to any disclaimer, the term of this patent is extended or adjusted under 35 U.S.C. 154(b) by 0 days.

(21) Appl. No.: 14/297,653

(22) Filed: Jun. 6, 2014

(65) Prior Publication Data

US 2015/0194037 A1    Jul. 9, 2015

(30) Foreign Application Priority Data

Jan. 8, 2014    (TW) .............................. 103100671 A

(51) Int. Cl.
| | | |
|---|---|---|
| *G08B 21/00* | (2006.01) | |
| *H02J 7/00* | (2006.01) | |
| *G09G 3/34* | (2006.01) | |

(52) U.S. Cl.
CPC ............ *H02J 7/0047* (2013.01); *G09G 3/3406* (2013.01); *G09G 2330/021* (2013.01); *H02J 2007/005* (2013.01)

(58) Field of Classification Search
CPC .. H02J 7/0047; H02J 7/1461; A61B 5/14532; G09G 3/2096; G09G 3/3406
USPC ....................... 340/636.2, 636.17, 14.67, 455; 320/103, 108; 345/211, 102
See application file for complete search history.

(56) References Cited

U.S. PATENT DOCUMENTS

| | | | | |
|---|---|---|---|---|
| 4,527,096 | A * | 7/1985 | Kindlmann ............ | H05B 33/08 315/169.3 |
| 4,678,999 | A * | 7/1987 | Schneider ...................... | 324/427 |
| 5,424,800 | A * | 6/1995 | Suzuki .......................... | 396/279 |
| 5,800,460 | A * | 9/1998 | Powers et al. ..................... | 607/5 |
| 8,963,527 | B2* | 2/2015 | Jing ................................ | 323/283 |
| 2004/0109390 | A1* | 6/2004 | Born ............................. | 368/203 |
| 2005/0128881 | A1* | 6/2005 | Gueissaz ........................ | 368/204 |
| 2005/0195182 | A1* | 9/2005 | Tahata .......................... | 345/211 |
| 2009/0058793 | A1* | 3/2009 | Shin ..................... | G09G 3/3406 345/102 |
| 2009/0209945 | A1* | 8/2009 | Lobl ................. | A61M 5/14224 604/891.1 |
| 2010/0308939 | A1* | 12/2010 | Kurs ........................... | 333/219.2 |
| 2011/0133687 | A1* | 6/2011 | Kim ....................... | H04M 1/21 320/101 |
| 2011/0234272 | A1* | 9/2011 | Yu .................................. | 327/157 |
| 2011/0234292 | A1* | 9/2011 | Forstner et al. ................ | 327/355 |
| 2011/0273136 | A1* | 11/2011 | Yoshimoto .................... | 320/103 |

(Continued)

FOREIGN PATENT DOCUMENTS

| | | |
|---|---|---|
| CN | 102013212 | 4/2011 |
| TW | 200614626 | 5/2006 |
| TW | 201318309 | 5/2013 |

*Primary Examiner* — Hoi Lau
(74) *Attorney, Agent, or Firm* — Jianq Chyun IP Office

(57) ABSTRACT

A charging indication apparatus and a method thereof are provided. A switching signal for controlling an operation frequency of a power conversion circuit is divided to obtain a divided frequency signal, and according to the divided frequency signal, a backlight module is controlled to emit a backlight source serving as a charging indication signal.

11 Claims, 2 Drawing Sheets

(56) References Cited

U.S. PATENT DOCUMENTS

| | | | |
|---|---|---|---|
| 2012/0112691 A1* | 5/2012 | Kurs et al. | 320/108 |
| 2013/0127701 A1* | 5/2013 | Cho | G09G 3/3406 345/102 |
| 2013/0187598 A1* | 7/2013 | Park et al. | 320/108 |
| 2013/0334892 A1* | 12/2013 | Hall et al. | 307/104 |
| 2014/0172181 A1* | 6/2014 | Nagahama et al. | 700/287 |
| 2014/0299137 A1* | 10/2014 | Kieckbusch et al. | 131/328 |
| 2015/0109029 A1* | 4/2015 | Lia et al. | 327/105 |

* cited by examiner

CHARGING INDICATION APPARATUS AND METHOD THEREOF

CROSS-REFERENCE TO RELATED APPLICATION

This application claims the priority benefit of Taiwan application serial no. 103100671, filed on Jan. 8, 2014. The entirety of the above-mentioned patent application is hereby incorporated by reference herein and made a part of this specification.

BACKGROUND

1. Field of the Invention

The invention is directed to an electronic apparatus and more particularly, to a charging indication apparatus and a method thereof.

2. Description of Related Art

In electronic products nowadays, such as mobile phones or tablet computers, when power of a battery is lower than a threshold, even though a charger is connected with for charging, an electronic apparatus still cannot be started up due to the energy output by the charger is so limited, and no reaction can be generated in response to a user pressing any key. The battery has to be continuously charged for 2 to 3 minutes, such that the battery can store sufficient power to provide transient energy required during a start-up transience of the electronic apparatus. For example, the battery has to be charged to have 3% or more electricity, such that the electronic apparatus can be started up successfully. However, many electronic products that are current available in the market is not equipped with any indication lights, and as a result, when the power of the battery is insufficient, the user cannot successfully start up the electronic apparatus by pressing the power-on key even when the electronic apparatus is in a charging state. The user also cannot determine whether the system is in a normal mode according to the indication lights, which causes troubles to the user.

SUMMARY

The invention provides a charging indication apparatus and a method thereof which allow an electronic apparatus applying the charging indication apparatus and the method thereof to indicate a charging state thereof even when electricity of the electronic apparatus is lower than a transient energy required during start-up transience.

The invention is directed to a charging indication apparatus suitable for an electronic apparatus. The charging indication apparatus includes a backlight module, a frequency dividing unit and a backlight controller. The frequency dividing unit divides a switching signal for controlling an operation frequency of the power conversion circuit to generate a divided frequency signal. The backlight controller is coupled to the backlight module and the frequency dividing unit and controls the backlight module to emit a backlight source serving as a charging indication signal according to divided frequency signal.

In an embodiment of the invention, the backlight module includes a plurality of light emitting diode (LED) units, and the backlight controller includes a driving unit and a plurality of switches. The driving unit is coupled to the LED units and drives the LED units to emit the backlight source. The switches are disposed on connection routes of the LED units being connected with the driving unit, and conduction states of the switches are controlled by the divided frequency signal.

In an embodiment of the invention, the divided frequency signal includes a plurality of sub divided frequency signals, and the sub divided frequency signals respectively have different frequencies.

In an embodiment of the invention, the charging indication apparatus further includes a liquid crystal display (LCD) panel and a timing sequence controller. The timing sequence controller is coupled to the frequency dividing unit and the LCD panel and controls the LCD panel to display a default view according to the divided frequency signal.

In an embodiment of the invention, the default view is a monochromatic view.

In an embodiment of the invention, the frequency dividing unit is a counter.

The invention is directed to a charging indication method of a charging indication apparatus, suitable for an electronic apparatus. The charging indication method includes the following steps. A switching signal for controlling an operation frequency of a power conversion circuit is divided to generate a divided frequency signal. According to the divided frequency signal, a backlight module of the electronic apparatus is controlled to emit a backlight source serving as a charging indication signal.

In an embodiment of the invention, the backlight module includes a plurality of LED units, and the step of controlling the backlight module of the electronic apparatus to emit the backlight source according to the divided frequency signal includes controlling the LED units to respectively emit in different emitting frequencies according to the divided frequency signal.

In an embodiment of the invention, the backlight module comprises a plurality of LED units, and the step of controlling the backlight module of the electronic apparatus to emit the backlight source according to the divided frequency signal includes controlling a portion of the LED units to emit according to the divided frequency signal.

In an embodiment of the invention, the method further includes controlling an LCD panel of the electronic apparatus to display a default view according to the divided frequency signal.

In an embodiment of the invention, the default view is a monochromatic view.

Based on the above, according to embodiments of the invention, the divided frequency signal is obtained by dividing the switching signal for controlling the operation frequency of the power conversion circuit, and according to the divided frequency signal, the backlight module is controlled to emit the backlight source which serves as the charging indication signal. Thereby, the electronic apparatus applying the charging indication apparatus and the method thereof can indicate the charging state thereof even when the electricity of the electronic apparatus is lower than the transient energy required during the start-up transience.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
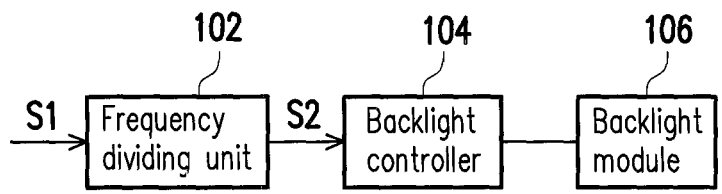
FIG. 1 is a schematic diagram illustrating a charging indication apparatus according to an embodiment of the invention.

FIG. 1 is a schematic diagram illustrating a charging indication apparatus according to an embodiment of the invention. Referring to FIG. 1, a charging indication apparatus may be applied to a portable electronic apparatus, such as a mobile phone, a tablet computer or a notebook computer. The charging indication apparatus includes a frequency dividing unit 102, a backlight controller 104 and a backlight module 106. The backlight controller 104 is coupled to the frequency dividing unit 102 and the backlight module 106. The frequency dividing unit 102 may receive a switching signal S1 and divide the switching signal S1 to generate a divided frequency signal S2. The frequency dividing unit 102 may be, for example, a counter, but the invention is not limited thereto. The switching signal S1 serves to control an operation frequency of a power conversion circuit (not shown) for controlling a switching operation of the electronic apparatus, and the power conversion circuit serves to convert a voltage provided by a battery of the electronic apparatus into a voltage required for an operation of an internal circuit of the electronic apparatus. The backlight controller 104 may control the backlight module 106 to emit a backlight source which serves as a charging indication signal according to the divided frequency signal S2.

Accordingly, a voltage required for driving the backlight controller 104 to control the backlight module 106 to emit the backlight source is much less than a transient voltage required for start-up, and thus, even though a level of the battery of the electronic apparatus, the backlight controller 104 still can directly drive the backlight module 106 to emit the backlight source to indicate a charging state of the electronic apparatus to the user. Additionally, in the present embodiment, only the backlight source emitted by the backlight module serves as the indication signal, and thus, no chip has to be additionally disposed in the electronic apparatus for controlling the LCD panel of the electronic apparatus to indicate complicated charging indication patterns (e.g., a battery pattern), and manufacturing cost of the electronic apparatus can be saved.

Figure 2:
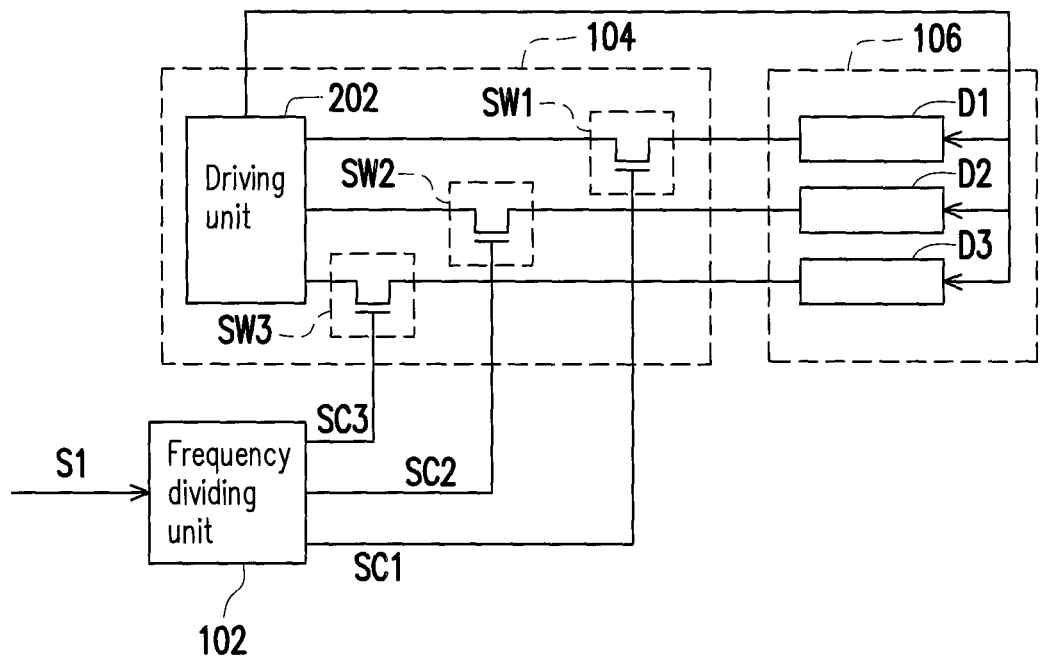
FIG. 2 is a schematic diagram illustrating a charging indication apparatus according to another embodiment of the invention.

FIG. 2 is a schematic diagram illustrating a charging indication apparatus according to another embodiment of the invention. Referring to FIG. 2, in the present embodiment, the backlight controller 104 may include a driving unit 202 and a plurality of switches SW1 through SW3. Additionally, the backlight module 106 may include a plurality of LED units D1 through D3. The switches SW1 through SW3 are respectively disposed between the corresponding LED units D1 through D3 and the driving unit 202. The switches SW1 through SW3 may be implemented by using transistors, as shown in FIG. 2, and besides, each of the LED units may be formed by, for example, a plurality of LEDs which are connected in series, but the invention is not limited thereto.

The driving unit 202 is coupled to the LED units D1 through D3 and may drive each of the LED units D1 through D3 to emit the backlight source. The frequency dividing unit 102 may divide the switching signal S1 to generate a plurality of sub divided frequency signals SC1 through SC3 having different frequencies, and conduction states of the switches SW1 through SW3 are respectively controlled by the sub divided frequency signals SC1 through SC3. Thus, the conduction states of the switches SW1 through SW3 are controlled by the sub divided frequency signals SC1 through SC3 having different frequencies, such that the LED units D1 through D3 are lit at different times to achieve a displaying effect in a scrolling style, for example, and a user is informed of a charging state of the electronic apparatus is this way.

It should be noted that in the aforementioned embodiment, the switches SW1 through SW3 are illustrated as three and the LED units D1 through D3 are illustrated as three for example, but the invention is not limited thereto. In an actual application, the charging indication apparatus may include more switches and more LED units. In addition, in some embodiments, the switches SW1 through SW3 may be totally turned off or partially turned on, so as to indicate the charging state of the electronic apparatus in a local dimming manner.

Figure 3:
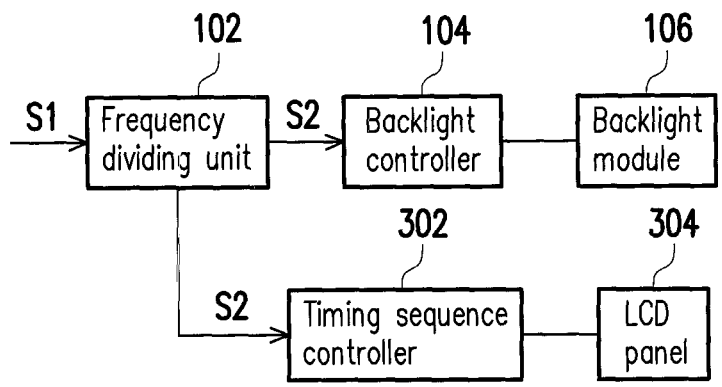
FIG. 3 is a schematic diagram illustrating a charging indication apparatus according to still another embodiment of the invention.

FIG. 3 is a schematic diagram illustrating a charging indication apparatus according to still another embodiment of the invention. Referring to FIG. 3, in the present embodiment, the charging indication apparatus further includes a timing sequence controller 302 and a LCD panel 304. The timing sequence controller 302 is coupled to the frequency dividing unit 102 and the LCD panel 304. The timing sequence controller 302 may control the LCD panel 304 to operate with the backlight module 106 to display a simple default view according to the divided frequency signal S2 output by the frequency dividing unit 102. The default view may be, for example, a monochromatic view in all white or all blue. Since the timing sequence controller 302 may display the default view without any chip being additionally disposed in the electronic apparatus, the manufacturing cost of the electronic apparatus still can be saved, and liquid crystal molecules in the LCD panel may be re-arranged to prevent the electronic apparatus from displaying distorted or deformed views.

Figure 4:
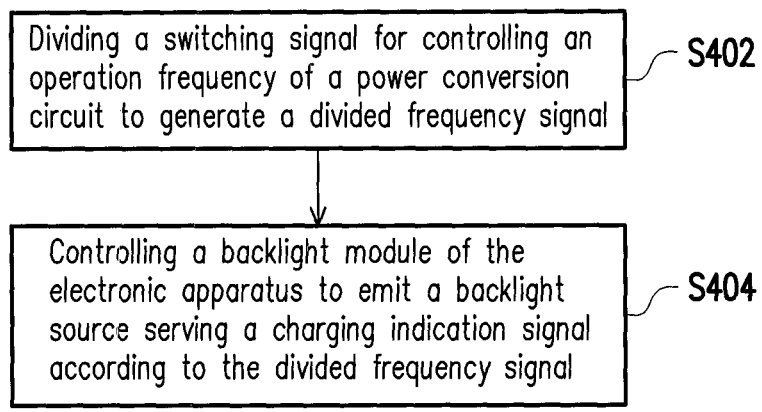
FIG. 4 is a flowchart illustrating a charging indication method of the charging indication apparatus according to an embodiment of the invention.

FIG. 4 is a flowchart illustrating a charging indication method of the charging indication apparatus according to an embodiment of the invention. In summary, the charging indication method of the charging indication apparatus may include the following steps. First, a switching signal for changing an operation frequency of a power conversion circuit is divided to generate a divided frequency signal (step S402). Then, according to the divided frequency signal, a backlight module of the electronic apparatus is controlled to emit a backlight source which serves as a charging indication signal (step S404). The backlight module may also include a plurality of LED units, and when the backlight module of the electronic apparatus is controlled to emit the backlight source according to the divided frequency signal, the LED units may be controlled to emit in different emitting frequencies to as to achieve a displaying effect in a scrolling style, and thereby, a user is informed of a charging state of the electronic apparatus in this way. In other embodiments, it may be a scenario where only a portion of LED units are controlled to emit so as to indicate the charging state of the electronic apparatus to the user in a local dimming manner.

Figure 5:
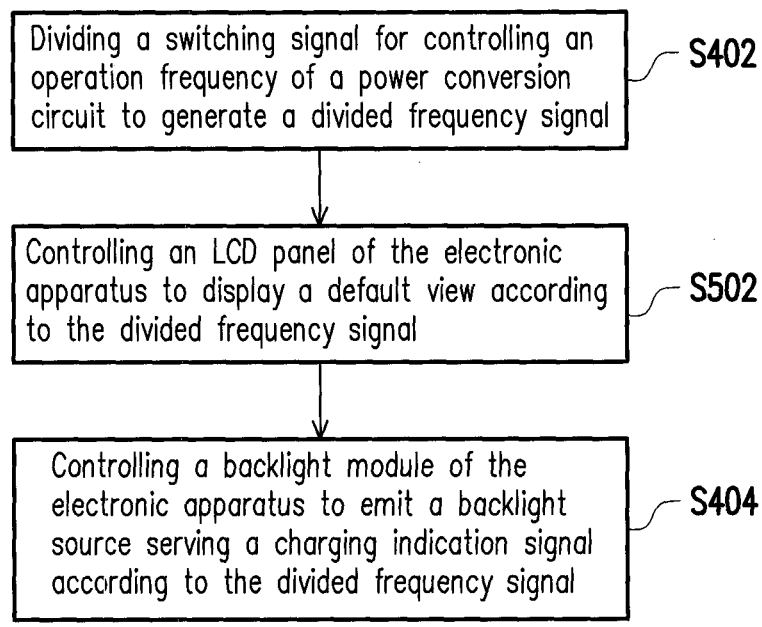
FIG. 5 is a flowchart illustrating a charging indication method of the charging indication apparatus according to another embodiment of the invention.

FIG. 5 is a flowchart illustrating a charging indication method of the charging indication apparatus according to another embodiment of the invention. Referring to FIG. 5, the charging indication method of the charging indication apparatus of the present embodiment is different from the charging indication method of the embodiment illustrated in FIG. 4 in that after step S402, the charging indication method of the present embodiment further includes controlling an LCD panel of the electronic apparatus to display a default view according to the divided frequency signal (step S502). The default view may be a monochromatic view in all white or all blue, for example. Thereby, the electronic apparatus may be prevented from displaying distorted or deformed images when the backlight module is controlled to emit the backlight source in step S404.

To sum up, in the invention, by dividing the switching signal for controlling the operation frequency of the power conversion circuit to obtain the divided frequency signal and by controlling the backlight module to emit the backlight source serving as the charging indication signal according to the divided frequency signal, the electronic apparatus applying the charging indication apparatus and the method thereof can display the charging state thereof even when the electricity of the electronic apparatus is lower than the transient energy required during the start-up transience of the electronic apparatus as well as the manufacturing cost of the electronic apparatus can be saved. In some embodiments, the LCD panel can be controlled according to the divided frequency signal with the default view displayed by the backlight module to prevent distorted or deformed images appearing while the electronic apparatus displays the charging indication signal.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A charging indication apparatus, suitable for an electronic apparatus, comprising:
    a backlight module;
    a frequency dividing unit, dividing a switching signal for controlling an operation frequency of a power conversion circuit to generate a divided frequency signal; and
    a backlight controller, coupled to the backlight module and the frequency dividing unit and controlling the backlight module to emit a backlight source serving as a charging indication signal according to the divided frequency signal.

2. The charging indication apparatus according to claim 1, wherein
    the backlight module comprises:
        a plurality of light emitting diode (LED) units; and
    the backlight controller comprises:
        a driving unit, coupled to the LED units and driving the LED units to emit the backlight source; and
        a plurality of switches, disposed on connection routes of the LED units being connected with the driving unit, wherein conduction states of the switches are controlled by the divided frequency signal.

3. The charging indication apparatus according to claim 2, wherein the divided frequency signal comprises a plurality of sub divided frequency signals, and the sub divided frequency signals respectively have different frequencies.

4. The charging indication apparatus according to claim 1, further comprising:
    a liquid crystal display (LCD) panel; and
    a timing sequence controller, coupled to the frequency dividing unit and the LCD panel and controlling the LCD panel to display a default view according to the divided frequency signal.

5. The charging indication apparatus according to claim 4, wherein the default view is a monochromatic view.

6. The charging indication apparatus according to claim 1, wherein the frequency dividing unit is a counter.

7. A charging indication method of a charging indication apparatus, suitable for an electronic apparatus, the method comprising:
    dividing a switching signal for controlling an operation frequency of a power conversion circuit to generate a divided frequency signal; and
    controlling a backlight module of the electronic apparatus to emit a backlight source serving as a charging indication signal according to the divided frequency signal.

8. The method according to claim 7, wherein the backlight module comprises a plurality of LED units, and the step of controlling the backlight module of the electronic apparatus to emit the backlight source according to the divided frequency signal comprises:
    controlling the LED units to respectively emit in different emitting frequencies according to the divided frequency signal.

9. The method according to claim 7 wherein the backlight module comprises a plurality of LED units, and the step of controlling the backlight module of the electronic apparatus to emit the backlight source according to the divided frequency signal comprises:
    controlling a portion of the LED units to emit according to the divided frequency signal.

10. The method according to claim 7, further comprising:
    controlling an LCD panel of the electronic apparatus to display a default view according to the divided frequency signal.

11. The method according to claim 10, wherein the default view is a monochromatic view.

* * * * *